(12) United States Patent
Gauthier et al.

(10) Patent No.: US 9,115,592 B2
(45) Date of Patent: Aug. 25, 2015

(54) SEALING DEVICE FOR JET ENGINE OIL CHAMBER

(75) Inventors: Gerard Philippe Gauthier, Champagne sur Seine (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 150 days.

(21) Appl. No.: 13/637,173

(22) PCT Filed: Mar. 23, 2011

(86) PCT No.: PCT/FR2011/050621
§ 371 (c)(1),
(2), (4) Date: Sep. 25, 2012

(87) PCT Pub. No.: WO2011/117542
PCT Pub. Date: Sep. 29, 2011

(65) Prior Publication Data
US 2013/0015018 A1    Jan. 17, 2013

(30) Foreign Application Priority Data
Mar. 26, 2010 (FR) ..................... 10 52237

(51) Int. Cl.
*F01D 11/02* (2006.01)
*F01D 11/00* (2006.01)
*F01D 25/18* (2006.01)

(52) U.S. Cl.
CPC ............ *F01D 11/001* (2013.01); *F01D 25/183* (2013.01); *F05D 2240/56* (2013.01)

(58) Field of Classification Search
CPC ................ F01D 25/183; F01D 11/02

USPC .......................................................... 184/6.11
See application file for complete search history.

(56) References Cited

U.S. PATENT DOCUMENTS

| | | | | |
|---|---|---|---|---|
| 3,529,698 A * | 9/1970 | Nelson | .......................... | 184/6.12 |
| 4,497,172 A * | 2/1985 | Smith | .......................... | 60/226.1 |
| 5,316,318 A * | 5/1994 | Veau | .............................. | 277/355 |
| 6,027,121 A * | 2/2000 | Cromer et al. | ................ | 277/347 |
| 6,070,881 A * | 6/2000 | Longree | ......................... | 277/409 |
| 6,572,115 B1 * | 6/2003 | Sarshar et al. | ................ | 277/412 |

(Continued)

FOREIGN PATENT DOCUMENTS

DE    10 2009 025 941    12/2009
EP     1 215 422          6/2002

OTHER PUBLICATIONS

International Search Report Issued Jun. 21, 2011 in PCT/FR11/50621 Filed Mar. 23, 2011.

*Primary Examiner* — William A Rivera
*Assistant Examiner* — Michael Riegelman
(74) *Attorney, Agent, or Firm* — Oblon, McClelland, Maier & Neustadt, L.L.P.

(57) ABSTRACT

A sealing device for a chamber including at least one rotary member and at least one static member of a jet engine and can contain a lubricating oil droplet suspension. The sealing device includes at least one brush seal that includes juxtaposed strands and is set to ensure sealing between at least one rotary member and at least one stationary member, a mechanism to recover part of the oil suspended within the inner space of the chamber, and a mechanism to deliver the recovered oil. The delivery mechanism is set up to generate a flow of oil along the strands of the brush seal, the oil flow being oriented in the direction of the rotary member. The brush seal thus provides better resistance to coking.

11 Claims, 5 Drawing Sheets

(56) References Cited

U.S. PATENT DOCUMENTS

| | | | |
|---|---|---|---|
| 6,609,888 B1* | 8/2003 | Ingistov | 415/231 |
| 7,434,813 B1* | 10/2008 | Franceschini et al. | 277/355 |
| 7,438,526 B2* | 10/2008 | Enderby | 415/231 |
| 2002/0074730 A1* | 6/2002 | Mayer et al. | 277/355 |
| 2004/0003968 A1* | 1/2004 | Rakhmailov | 184/6.11 |
| 2004/0256807 A1* | 12/2004 | Bhate et al. | 277/355 |
| 2009/0302543 A1* | 12/2009 | Ruggiero et al. | 277/303 |
| 2011/0072640 A1* | 3/2011 | Ruggiero et al. | 29/596 |
| 2011/0198155 A1* | 8/2011 | Charier et al. | 184/6.23 |
| 2012/0126484 A1* | 5/2012 | Dos Santos et al. | 277/355 |

* cited by examiner

SEALING DEVICE FOR JET ENGINE OIL CHAMBER

BACKGROUND OF THE INVENTION

1. Field of the Invention

The invention relates to a turbojet and in particular a sealing device for a turbojet oil enclosure.

2. Description of the Related Art

A turboshaft for an aircraft generally comprises, arranged in the direction of the gas flow: a fan, one or more compressor stages, for example a low-pressure compressor and a high-pressure compressor, a combustion chamber, one or more turbine stages, for example a high-pressure turbine and a low-pressure turbine, and a gas exhaust nozzle. Each compressor may be associated with a turbine, the two elements being linked by a shaft, thereby forming, for example, a high-pressure core and a low-pressure core.

Turbojets generally have, substantially around the upstream extremity of the high-pressure core, an "upstream enclosure" containing bearing and gear members. They also generally have, substantially around the downstream extremity of the high-pressure core, a "downstream enclosure" containing oil-lubricated bearing and gear members. The oil, projected by these rotary parts, forms a mist (or suspension) of suspended droplets within the enclosures. Furthermore, they are traversed by a gas flow (air), in particular for ventilation purposes. To prevent the oil from being carried out of the enclosures by the gas flow, the gases are evacuated into "oil separators" generally formed by radial chimneys arranged in the low-pressure shaft, the oil being captured on the walls thereof and returned to the corresponding enclosure by centrifugal force. The oil separators communicate with a degassing tube (also rotary) concentric to the low-pressure shaft and in the enclosure of which the gases are carried from the oil separators to the outlet of the degassing tube where they are ejected, generally around the turbojet nozzle.

The upstream and downstream enclosures are formed and delimited by the walls of the stationary structure of the turbojet, but also by the walls of the rotary elements. They must enable the passage of a gas flow, but retain as much oil as possible therein, and for this reason the seal between the stationary elements and the rotary elements of an oil enclosure is a particularly delicate problem.

Traditionally, the seal is effected using a labyrinth joint, i.e. formed by ribs rigidly connected to a rotary part and an abradable material rigidly connected to a stationary part against which the ribs rub. This rubbing occurs with a given clearance to enable the passage of a gas flow coming from the low-pressure or high-pressure compressors; these gases oppose the egress of oil through the labyrinth joint; the flow rate thereof is dimensioned to be sufficient at slow speeds and is therefore excessive in other flight phases (in which the flow rate of the air aspirated by the fan of the turbojet is greater). This excessive flow in the other flight phases has at least two detrimental effects: firstly, it proportionately reduces the efficiency of the engine and, secondly, it tends to draw a greater quantity of oil out of the enclosure, around the oil separators.

It has therefore been envisaged to replace the labyrinth joints with "brush" seals, i.e. having a plurality of juxtaposed, substantially radial fibers that are attached to a stationary part, the free extremities of which are in contact with a rotary part (or very close thereto), the fibers being preferably slightly inclined in the direction of rotation of the rotary part; the fibers of the brush seal may for example be made of carbon. Such a device is in particular described in patent application US 2004/0256807 filed by General Electric.

Such brush seals have the advantage of needing to be traversed by a gas flow having a flow rate that is not too high to guarantee the oil seal thereof On the other hand, they have the drawback of tending to cause coking of the oil they come into contact with. Coking is the transformation of oil into a solid deposit; it is caused by reheating oil stuck to the carbon fibers; it reduces the effectiveness of the brush seal. Furthermore, the rubbing of the bristles on the track of the rotary part designed to touch the extremities thereof causes them to wear and therefore also reduces the effectiveness thereof over time.

BRIEF SUMMARY OF THE INVENTION

The invention is intended to mitigate these drawbacks and in particular to propose a sealing device for a turbojet oil enclosure that is effective and that has features that are durable over time.

Accordingly, the invention relates to a sealing device for an enclosure that is formed by at least one rotary member and at least one static member of a turbojet and that is intended to contain a suspension of lubricating oil droplets, the sealing device comprising at least one brush seal, with juxtaposed strands, arranged to create a seal between at least one rotary member and at least one stationary member (from the rotary member or members and the stationary member or members presented above), the device being characterized in that it comprises means for recovering some of the oil suspended within the internal volume of the enclosure and means for channeling said recovered oil that are arranged such as to generate an oil flow along the strands of said brush seal towards the rotary member.

The invention creates a flow of oil along the strands of the brush seal, which guarantees a recirculation of the oil in contact therewith, since said oil is drawn along the strands. The residual oil is therefore drawn by the oil supplied and does not have time to degrade; coking phenomena are thereby reduced, which prevents the strands from sticking together, thereby improving both the effectiveness and longevity of the seal. Furthermore, the strands are lubricated and therefore less degraded by the rotary contact thereof with the members of the turbojet.

The invention is particularly notable in that it addresses a problem related to the presence of oil on the joint precisely by supplying said joint with oil; thus, although it could be considered that the best way to protect the joint from oil would be to improve the oil seal thereof, the oil seal of the joint is in fact improved using oil.

The means for channeling the recovered oil can be dimensioned to control the oil flow along the strands of the brush seal.

The oil flow can thereby be arranged to reduce the temperature of the brush seal, thereby further reducing coking phenomena.

In one embodiment, the device has means for returning the oil to the interior of the enclosure after it has flowed over the strands. This encourages the oil to flow, the oil being drawn between the means for channeling the recovered oil and the means for evacuating the oil.

In one embodiment in this case, the device is arranged such that the return means include a gas flow passing through the brush seal. The gas-flow evacuation effect may be reinforced by a centrifugal force related to the rotation of the rotary parts.

Preferably, if the strands of the brush seal (more specifically the free extremities of the strands thereof) are intended to rub against a track of an opposing part, said channeling means are arranged such that the oil flow along the strands supplies oil to the track. The friction zone between the seal and the track is therefore lubricated, which reduces the wear of these parts.

Also preferably, as the lubricating oil is degraded by temperature (oxidation and coking), it includes at least an additive designed to prevent coking. Such an additive is known, but it loses effectiveness over time. The oil supply provided for in the invention recirculates the oil (and therefore the additive thereof), preserving the anti-coking properties thereof.

In a preferred embodiment, the means for channeling the recovered oil include at least one gravitational channel for guiding the oil from the recovery means to the brush seal.

In an embodiment in this case, as the seal includes an at least partially hollow torus (i.e. having an internal volume) to which the strands are attached, the channeling means include at least one channel for guiding the oil from the recovery means to the interior of the torus (i.e. into the internal volume thereof) to impregnate the strands where they are attached to the torus. This further improves lubrication of the strands of the seal.

In one embodiment, the oil recovery means include, in the top of the turbojet, a gravitational recovery tank for the oil in the oil suspension.

In one embodiment, the oil recovery means include at least one oil retention rib combined with a slot for guiding the oil from the rib to the brush seal (the slot in this case forming the guide channel).

According to a preferred embodiment, the means for channeling the recovered oil include an oil source specific to the brush seal, i.e. dedicated to supply it.

The invention also concerns a turbojet with a sealing device having the features of the sealing device disclosed above.

BRIEF DESCRIPTION OF THE SEVERAL VIEWS OF THE DRAWINGS

The description can be better understood from the description below of the preferred embodiment of the turbojet according to the invention, with reference to the attached drawings, in which.

DETAILED DESCRIPTION OF THE INVENTION

Figure 1:
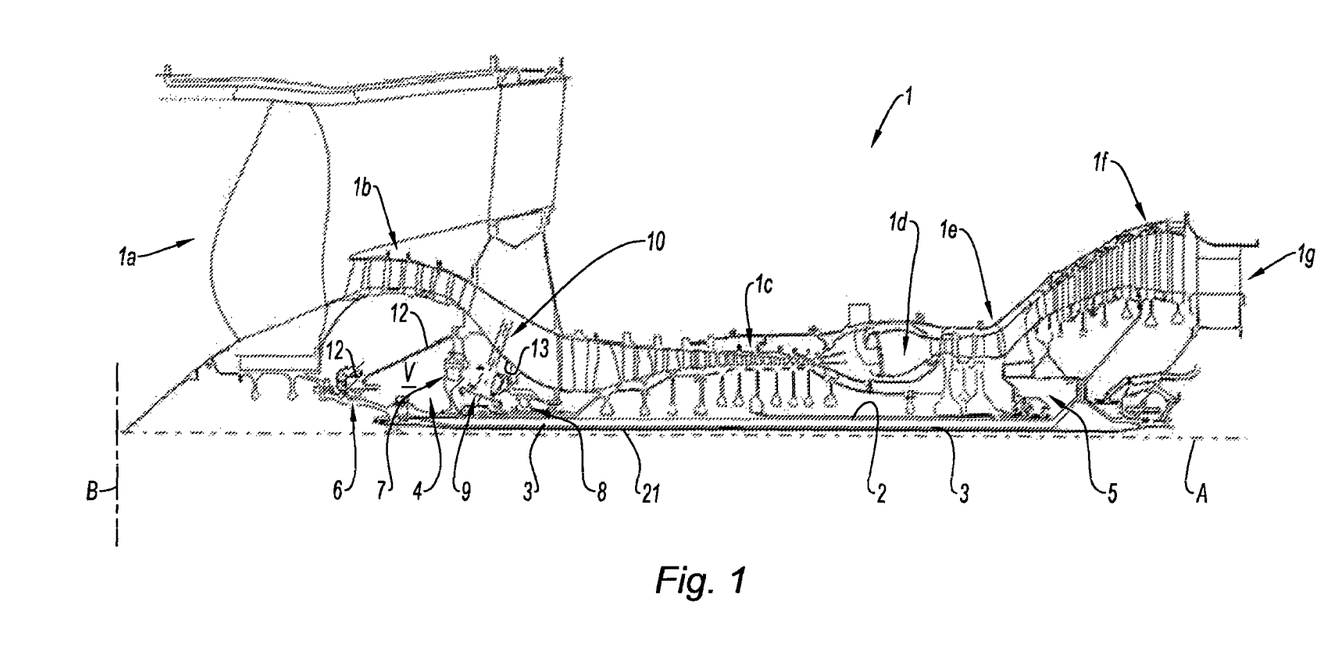
FIG. 1 is a global axial profile of the turbojet according to the invention.

With reference to FIG. 1, a turbojet 1 according to the first embodiment of the invention conventionally comprises a fan 1a, a low-pressure compressor 1b, a high-pressure compressor 1c, a combustion chamber 1d, a high-pressure turbine 1e, a low-pressure turbine 1f and an exhaust nozzle 1g. The high-pressure compressor 1e and the high-pressure turbine 1e are joined by a high-pressure shaft 2 and form therewith a high-pressure core. The low-pressure compressor 1b and the low-pressure turbine 1f are joined by a low-pressure shaft 3 and form therewith a low-pressure core.

The turbojet 1 comprises static (or stationary) members and rotary members, forming the different functional elements above, in a known manner.

The turbojet 1 has, close to the upstream extremity of the high-pressure core, an "upstream enclosure" 4 containing the bearing and gear members and, near to the downstream extremity of the high-pressure core, a "downstream enclosure" 5 containing bearing and gear members. These enclosures 4, 5 are conventionally referred to by the person skilled in the art as oil enclosures 4, 5 as they contain a suspension of oil droplets, as explained below.

The turbojet 1 extends globally along an axis A which is the axis of rotation of the rotary members thereof and in particular the axis of the low-pressure and high-pressure shafts 3, 2. In the remainder of the description, the concepts longitudinal, radial, internal and external shall relate to this axis A.

The different embodiments of the invention are described in relation to the upstream enclosure 4, but it shall be understood to apply equally to the downstream enclosure 5 and in general to any other enclosure containing or housing members with an oil suspension for the lubrication thereof.

The upstream enclosure 4 defines a volume in which are housed the bearing and gear members. In this case, the upstream enclosure 4 houses a first bearing 6, a second bearing 7 and a third bearing 8, these bearings 6, 7, 8 each having an internal ring 6a, rigidly connected to the low-pressure shaft 3, an external ring 6b, rigidly connected to the stationary structure of the turbojet and rolling means 6c such as balls or rollers between the rings 6a, 6b to enable the rotation of the internal ring 6a in relation to the external ring 6b (only rings 6a, 6b and rolling means 6c of the first bearing 6 have been referenced in the figures). The upstream enclosure 4 also contains the internal extremity 9 of an output shaft 10 connected to the high-pressure shaft 2, the external extremity of this shaft 10 being connected to an accessory gearbox (not shown), commonly referred to as an AGB, for Accessory Gear Box, by the person skilled in the art.

The upstream enclosure 4 defines an internal volume V delimited by stationary members and rotary members, more specifically by the walls of the stationary members and the rotary members. In this case, the upstream enclosure 4 is notably delimited on the internal side by the upstream extremity portion of the low-pressure shaft 3 and the parts rigidly connected to this shaft, on the upstream external side by a housing 12 rigidly connected to the stationary structure of the turbojet and supporting the external ring 6b of the first bearing 6 and on the downstream side by a housing 13 partially delimiting the internal envelope of the gas path (between the low-pressure compressor 1b and the high-pressure compressor 1c).

The bearings contained in the internal volume V of the enclosure 4 are supplied with lubricating oil in a known manner; the oil, projected by the parts in rotation, forms a mist (or suspension) of suspended droplets within the enclosure 4. This oil supply to the bearings of the enclosure 4 may be accomplished in different ways. In this case, the internal ring 6a of the first bearing 6 is provided with orifices (not shown) to enable oil to enter the bearing 6 before moving, by centrifuging, towards the internal volume V of the enclosure 4, as shown schematically by the arrow F1 in FIG. 2; the oil is projected into the enclosure 4 and more specifically centrifuged when the internal ring 6a rotates. In another embodiment not shown, one or more oil supply sprinklers may be arranged near to the rolling means 6c of the first bearing 6, in a known manner.

The upstream enclosure 4 also includes, on the upstream side thereof, a seal 14 used to provide the oil seal of the enclosure 4, between the rotary members and static members thereof, in this case between the housing 12 and the low-pressure shaft 3, more specifically between the housing 12 and an intermediate part 15 rigidly connected to the low-pressure shaft 3, as detailed below. This seal 14 is a brush seal 14. It includes a ring torus 16, rigidly connected to a wall of the stationary structure of the turbojet (in this case rigidly connected to the housing 12 of the stationary structure), to which are attached the strands 17 or bristles 17, in this case made of carbon, arranged to come into contact with a wall of a rotary member of the turbojet. The torus 16 is rigid and for example made of a metal, in this case steel. More specifically in this case, the housing 12 of the stationary structure has, in the upstream portion thereof, a groove in which the torus 16 is seated, this latter being locked in position by a nut 18 in a known manner.

The enclosure 4 is located, on the upstream side, close to the upstream extremity of the low-pressure shaft 3. The internal ring 6a of the first bearing 6 is attached directly to the low-pressure shaft 3. This latter has, upstream of this internal ring 6a and separated therefrom, a radial shoulder 3' forming a rim towards the external side. An intermediate part 15 performing a plurality of functions is attached between the internal ring 6a and the radial shoulder 3'. In this case, this intermediate part 15 is a one-piece part; as a whole, it is a core of revolution; it comprises a first annular longitudinal portion 15a, on the downstream side, prolonged by a radial portion 15b from which are arranged two portions, namely a radial flange 15c and a second annular longitudinal portion 15d, the upstream extremity 15e of which is attached to the low-pressure shaft 3. The first longitudinal downstream portion 15a of the intermediate part 15 is attached between the internal ring 6a and the shoulder 3' of the low-pressure shaft and is used to attach the intermediate part 15. The radial portion 15b thereof extends along the radial wall of the shoulder 3' and beyond the external side thereof. The radial flange thereof 15c forms a screen for the oil supplying the enclosure 4 coming from the internal ring 6a of the first bearing 6, to prevent it from being projected directly onto the seal 14; the person skilled in the art conventionally refers to such a flange 15c forming a screen for oil droplets as an "oil slinger". In this case in particular it enables the supply of oil to the seal 14 to be controlled. The second annular longitudinal portion 15d has an external surface 15f that forms a track for the strands 17 of the brush seal 14, i.e. this surface 15f is arranged such that the free extremities of the strands 17 come into contact therewith; it will be noted that the intermediate part 15 is rigidly connected to the low-pressure shaft 3 and therefore driven in rotation therewith, while the brush seal 14 is static since it is rigidly connected to the housing 12 of the stationary structure. The strands 17 of the seal 14 are preferably inclined in the transversal plane in the direction of rotation of the low-pressure shaft 3, in a known manner, to accompany the rotation of the track 15f with which they are in contact.

According to the invention, the seal 14 is supplied with lubricating oil h to generate, guide and draw an oil flow along the strands 17 thereof; thereby guaranteeing a flow of oil along the strands 17 and thus guaranteeing the long-term effectiveness of the seal 14, as explained above in the introduction of the description.

Figure 2:
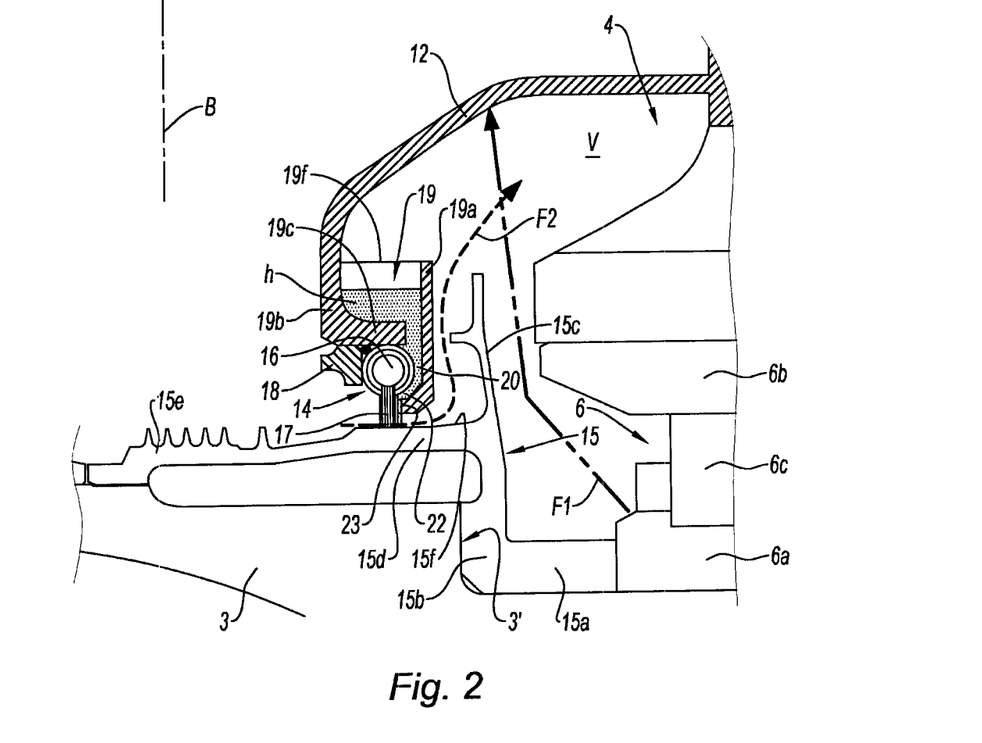
FIG. 2 is a schematic axial profile of the upstream enclosure of the turbojet in FIG. 1, in a first embodiment of the invention.
Figure 3:
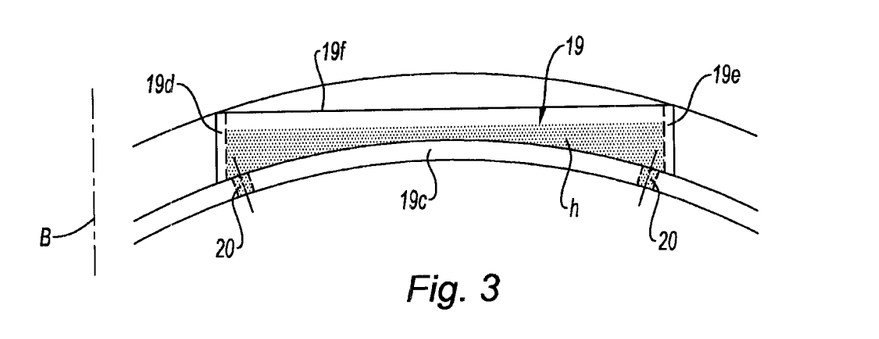
FIG. 3 is a partial cross section of the upper part of the enclosure in FIG. 2.
Figure 4:
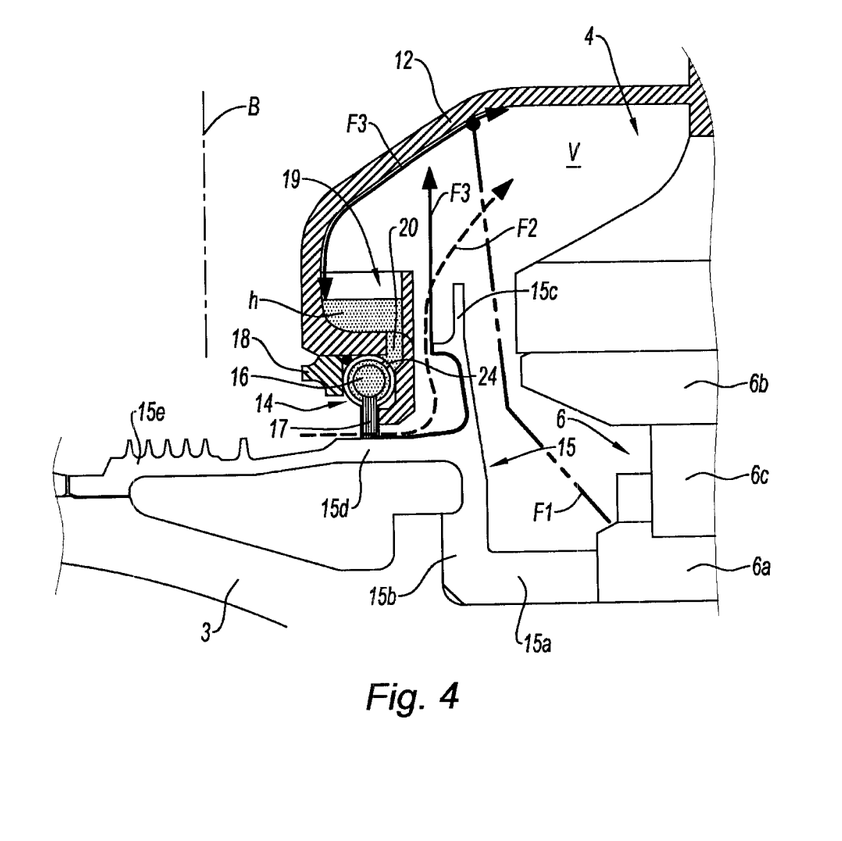
FIG. 4 is a schematic axial profile of the upstream enclosure of the turbojet in FIG. 1, in a second embodiment of the invention.

In the first embodiment shown in FIGS. 2 and 3, the turbojet 1 includes a gravitational recovery tank 19 for the oil h in the oil suspension of the enclosure 4. This tank 19 is therefore intended to capture or recover some of the oil in suspension in the internal volume V of the enclosure 4. The turbojet 1 also has channels 20 for carrying and guiding the oil from the tank 19 to the brush seal 14 and more specifically to the strands 17 thereof.

The top and the bottom, as well as the concepts of upper and lower, are defined in relation to the vertical, this latter being defined, for a turbojet, as the vertical direction in the assembly position thereof on a stationary airplane, i.e. an airplane placed on a horizontal plane. A vertical axis B is drawn on the figures. The axis A of the turbojet 1 is therefore horizontal in the figures.

More specifically, with reference to FIG. 3, the tank 19 is placed at the top of the turbojet 1. It takes the form of a enclosure closed on all of the faces thereof except the upper face thereof More specifically, it is formed by a downstream wall 19a facing an upstream wall 19b formed by an internal portion of the housing 12 of the stationary structure, by a lower (internal) wall 19c formed by a redirection (towards the downstream side) of the housing 12 of the stationary structure, linking the upstream walls 19b and 19a, and by two sidewalls 19d, 19e located on either side. The upper face thereof 19f is open. The downstream wall 19a and the side walls 19d, 19e are vertical flat walls, the lower wall 19c matches the annular shape of the housing and the open upper face 19f is horizontal.

The oil is projected against the internal surface of the housing 12 of the stationary structure, as shown schematically by the arrow F1. Some of the oil is in suspension in the enclosure 4 and on the different members that it contains; some of the oil flows on the internal surface of the housing 12 of the stationary structure and flows by gravity from the top of the turbojet 1 downwards; indeed, the housing 12 is conical and the diameter thereof decreases from the downstream side to the upstream side, thereby enabling such a flow. Some of this oil therefore runs into the tank 19 where it is received, forming a bath of oil h.

The channels 20 extend radially and lead firstly to the tank 19 and secondly to near the external side of the strands 17 of the brush seal 14, the channels 20 surrounding the torus 16 to guide the oil towards the external side of the strands 17. In this case, and more specifically, the turbojet 1 has two channels 20 located on either side of the tank 19, as shown in FIG. 3. The oil h contained in the tank 19 flows by gravity through the channels 20 and supplies an annular chamber 22 (on 360°) arranged between the internal part of the downstream wall 19a forming the tank 19 and the internal part of the torus 16 of the brush seal 14; the annular chamber 22 is "flooded" with oil, i.e. the volume thereof is completely filled with oil. A plurality of small channels 23, in this case equidistant lunules, for carrying oil from the annular chamber 22 to the strands 17, are formed and enable the distribution of the oil along the strands 17, through the joint effects of gravity and capillarity. The flow rate of the oil h supplying the brush seal 14 is regulated and defined by the volume of the tank 19 and the dimensions of the annular chamber 22 and of the channels 20, 23. The oil flows along the strands 17 of the seal 14 to the track 15f with which these strands 17 are in contact.

Furthermore, the brush seal 14 is arranged to enable the passage of a gas flow (air) from the exterior to the interior V of the enclosure 4, as symbolized by the arrow F2. This gas flow prevents oil from leaking out of the enclosure 4, in a known manner. Furthermore, this gas flow forms a means for evacuating the oil once it has reached the internal extremity of the strands 17 of the seal 14 and the track 15f, thereby encouraging the oil to flow along the strands 17. More specifically, the gas flow is combined with the oil slinger 15c to evacuate the oil h: the oil is carried by the gas flow F2 to the oil slinger 15c by which it is driven by centrifuging into the enclosure 4 where it is again suspended in the form of droplets. The gas flow F2 flows through the enclosure 4 and escapes through oil-removal chimneys or oil separators (not shown but known and already presented in the introduction of the description) before being guided into a degassing tube 21 that extends concentrically to the low-pressure shaft 3, in a known manner.

It will be noted incidentally that if the airplane were to adopt a position in which the tank 19 was no longer oriented horizontally, oil could leak from this latter; this may apply for example, in a military application, to an inverted flight of a fighter plane. Where this occurs, it would not have problematic consequences since such situations do not usually last long, and a temporary interruption of the oil supply to the seal is not problematic.

Other embodiments of the turbojet according to the invention are described below. These embodiments are very similar to the preceding embodiment, with only the elements related to the oil supply to the brush seal 14 being changed. This is why the references used for the elements of the turbojets in FIGS. 4 to 7 having identical, equivalent, similar or comparable function or structure to the elements of the turbojet in FIGS. 1 to 3 are the same, to simplify the description. Furthermore, the entire description of the turbojet in FIGS. 1 to 3 is not reproduced, this description applying to the turbojets in FIGS. 4 to 7 where not incompatible. Only notable, structural and functional differences are described.

The arrows F3 show one or more possible trajectories for the droplets of oil h in these embodiments.

In the embodiment in FIG. 4, the sealing device again includes a tank 19 for the gravitational recovery (or capture or withdrawal) of oil h from the oil suspension of the enclosure 4 and the channels 20 carrying the oil from the tank 19 to the brush seal 14. The channels 24 are also arranged in the torus 16 holding the strands 17, which is hollow; they lead at one extremity to the channels 20 carrying the oil from the tank 19 and at the other extremity to an internal volume of the torus 16 communicating with the external radial extremity of the strands 17. Thus, the channels 20, 24 are arranged to fluidly connect the oil tank 19 to the external radial extremity of the strands 17, thereby enabling the strands 17 to be directly impregnated with the oil, via the external extremities thereof. The flow of oil along the strands 17 is thereby further improved. As previously, the oil h is evacuated from the internal side of the strands 17 to encourage the flow thereof and to prevent the agglomeration thereof on the strands 17.

Figure 5:
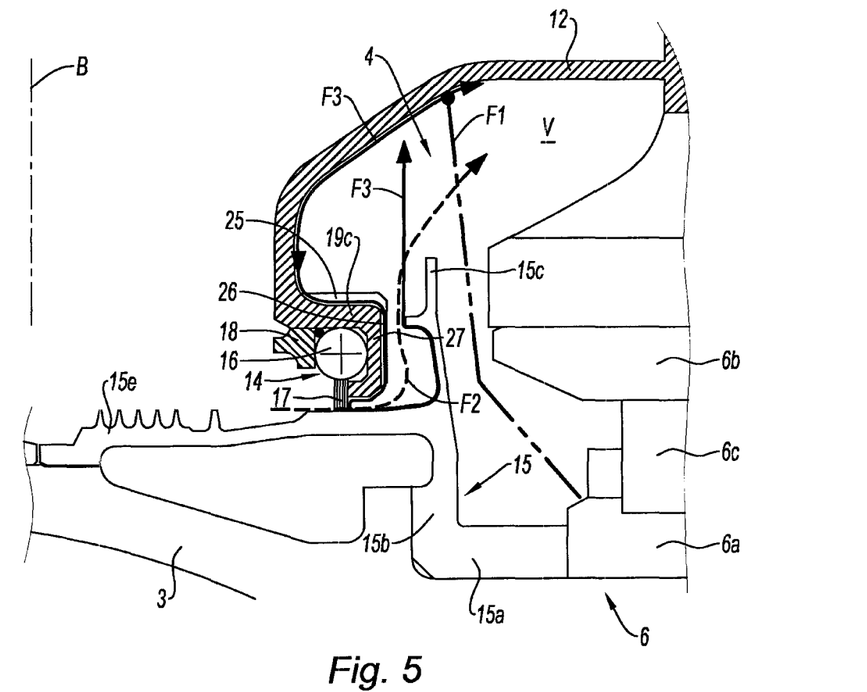
FIG. 5 is a schematic axial profile of the upstream enclosure of the turbojet in FIG. 1, in a third embodiment of the invention.
Figure 6:
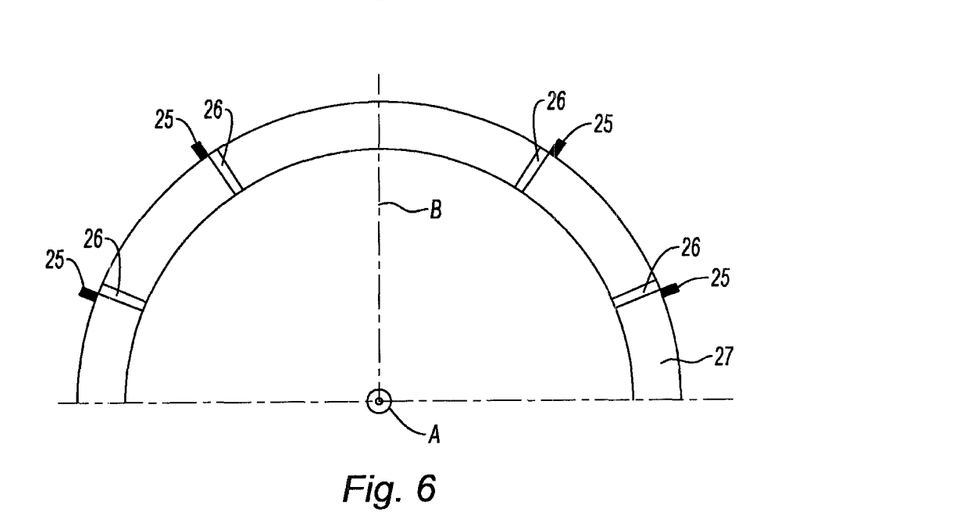
FIG. 6 is a partial cross section of the upper part of the enclosure in FIGS. 5

In the embodiment in FIG. 5, the sealing device includes means for recovering oil from the oil suspension of the enclosure 4 comprising at least one set of one oil retention or stopping rib 25 and one slot 26 to guide the oil from the rib 25 towards the strands 17 of the seal 14; in this case, it comprises four sets of one rib 25 and one slot 26, which are arranged at the top of the turbojet, as shown in FIG. 6. More specifically, each rib 25 extends radially outwards from the external surface of the internal wall 19c formed by a redirection (towards the downstream side) of the housing 12 of the stationary structure; it extends longitudinally along the entire length of this internal wall 19c; the function thereof is to form a retaining dam for the oil flowing along the external surface of this wall 19c; some of the oil is therefore retained just upstream of each rib 25 and the remainder passes above this latter. Each slot 26 is arranged in the downstream surface of the downstream wall 27 of the groove in which the torus 16 is seated; the slot 26 extends radially along this downstream wall 27; it is also arranged just above the rib 25, level with the oil dam, the oil then being guided in the slot 26 from the retention zone thereof above the rib 25. The oil is therefore guided towards the internal part of the strands 17 upon which it is distributed by the joint effects of gravity and capillarity; the oil is here evacuated in the same manner as in the previous embodiments.

The embodiment in FIG. 5 is the preferred embodiment of the invention. Indeed, it is simple to manufacture since simple pairs of ribs 25 and slots 26 are required. The operation thereof is also very simple since the oil is drawn by gravity towards the bottom of the turbojet and is held in this movement by the ribs 25 and guided from the ribs 25 to the seal 14 by the slots 26.

Figure 7:
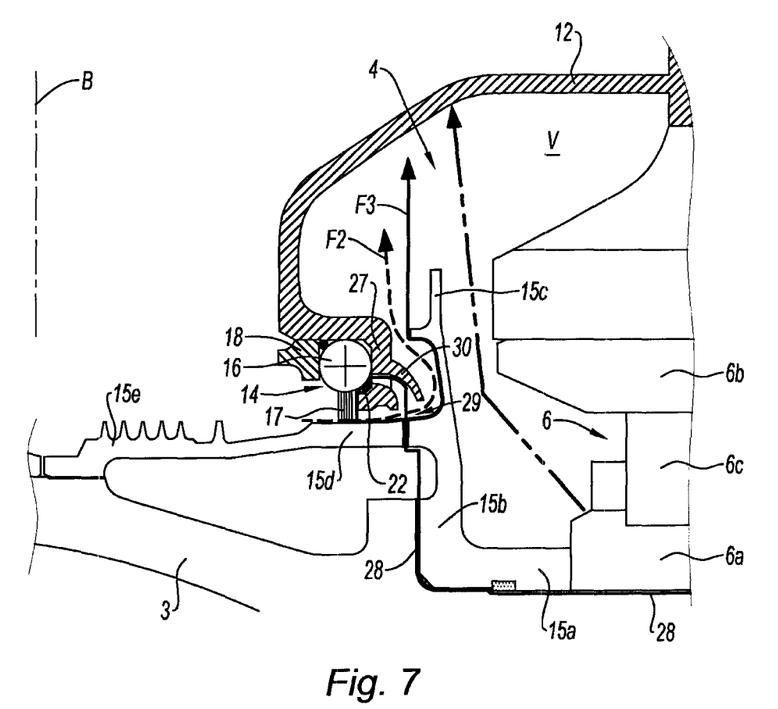
FIG. 7 is a schematic axial profile of the upstream enclosure of the turbojet in FIG. 1, in a fourth embodiment of the invention.

In the embodiment in FIG. 7, the sealing device comprises means for supplying oil from a source specifically dedicated to supplying the brush seal 14 with oil. More specifically, the device comprises channels 28 for guiding the oil from the low-pressure shaft 3 (supplied from the same oil source as the oil supplying the bearing); these channels 28 form the specific dedicated source of oil. The oil is guided to the orifices 29 provided in the second annular longitudinal portion 15d of the intermediate part 15, at the base of the oil slinger 15c; in this case there are two of these orifices 29, although a different number may be used. The oil is projected centrifugally against a scoop 30 formed by a rounded wall protruding from the downstream wall 27 of the groove in which the torus 16 is seated. Channels 31 are provided in the downstream wall 27 of the groove, beneath the scoop 30, and they communicate with an annular chamber 22 provided between the internal part of the downstream wall 19a, forming the tank 19 and the internal part of the torus 16 of the brush seal 14; the scoop 30 is then finally arranged to guide the oil projected thereupon towards the annular chamber 22, which is thereby "flooded" with oil, i.e. the volume thereof is completely filled with oil. As in the embodiment in FIG. 2, a plurality of small channels 23 for carrying oil from the annular chamber 22 to the strands 17 are provided and they enable the distribution of the oil along the strands 17. In this case, the oil is evacuated in the same manner as in the previous embodiments.

The invention is described in relation to the preferred embodiments, but other embodiments are naturally possible. In particular, the features of the different embodiments described may be combined, where they are not incompatible.

The invention claimed is:

1. A turbojet comprising at least one enclosure that is formed by at least one rotary member and at least one static member of the turbojet, said enclosure containing a suspension of lubricating oil droplets, the enclosure comprising a sealing device comprising:

at least one brush seal including juxtaposed strands, radially oriented towards the rotary member, said strands being attached at one of their ends to a fixed member secured to the static member, the sealing device being configured to create a seal between the rotary member and the one static member to prevent oil from leaking out of the enclosure;

means for collecting some of the oil flowing along one wall of the enclosure; and means for steering oil recovered from said one wall towards the fixed end of the strands of the brush seal, wherein the brush seal is arranged to enable the passage of a gas flow from an exterior to an interior of the enclosure for evacuating the oil once the oil has reached the fixed end of the strands thereby to encourage the oil to flow along the strands.

2. The turbojet as claimed in claim 1, wherein the means for steering includes at least one gravitational channel for guiding the oil from the means for collecting to the brush seal.

3. The turbojet as claimed in claim 2, wherein the means for collecting includes, at a top of the turbojet, a tank for gravitational recovery of oil flowing along said one wall of the enclosure.

4. The turbojet as claimed in claim 3, wherein said one wall is formed by a wall of a housing of the enclosure, said housing being conical and a diameter thereof decreasing from a downstream side to an upstream side.

5. The turbojet as claimed in claim 3, wherein the tank is provided radially above the brush seal and takes the form of an enclosure presenting an upper face which is open.

6. The turbojet as claimed in claim 1, wherein the rotary member comprises, inside the enclosure and close to the brush seal, a radial flange which is configured to receive the oil carried by the gas flow and to centrifugate the oil into the enclosure to suspend the oil again in the form of droplets.

7. The turbojet as claimed in claim 6, wherein the radial flange forms a screen for the oil supplying the enclosure coming from at least one bearing of the rotary member, to prevent the lubricating oil from being projected directly onto the seal.

8. The turbojet as claimed in claim 7, wherein the radial flange drives the oil which is carried to the radial flange by the gas flow into the enclosure, thereby centrifuging the oil into the enclosure where the oil is again suspended in the form of droplets.

9. The turbojet as claimed in claim 1, wherein the enclosure comprises at least one bearing of the rotary member which is supplied with lubricating oil and which projects said lubricating oil into the enclosure to form a suspension of suspended droplets within the enclosure.

10. The turbojet as claimed in claim 9, wherein the rotary member includes a radial flange which forms a screen for the oil supplying the enclosure coming from the at least one bearing, to prevent the lubricating oil from being projected directly onto the seal.

11. The turbojet as claimed in claim 10, wherein the radial flange drives the oil which is carried to the radial flange by the gas flow into the enclosure, thereby centrifuging the oil into the enclosure where the oil is again suspended in the form of droplets.

* * * * *